United States Patent
Lam

(10) Patent No.: US 6,904,516 B2
(45) Date of Patent: Jun. 7, 2005

(54) MECHANISM FOR ENABLING EFFICIENT EXECUTION OF AN INSTRUCTION

(75) Inventor: Ioi K. Lam, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 510 days.

(21) Appl. No.: 10/198,446

(22) Filed: Jul. 17, 2002

(65) Prior Publication Data

US 2004/0015679 A1 Jan. 22, 2004

(51) Int. Cl.$^7$ ................................................ G06F 9/45
(52) U.S. Cl. ...................................... 712/227; 717/139
(58) Field of Search ........................... 712/227; 717/139

(56) References Cited

U.S. PATENT DOCUMENTS

| | | | | |
|---|---|---|---|---|
| 5,940,619 A | * | 8/1999 | Abadi et al. ................ | 717/156 |
| 6,044,220 A | * | 3/2000 | Breternitz, Jr. ............. | 717/139 |
| 6,094,528 A | * | 7/2000 | Jordan ........................ | 717/115 |
| 6,260,187 B1 | * | 7/2001 | Cirne ......................... | 717/110 |
| 6,446,084 B1 | * | 9/2002 | Shaylor et al. ............. | 707/200 |
| 6,820,255 B2 | * | 11/2004 | Babaian et al. ............. | 717/151 |

\* cited by examiner

Primary Examiner—William M. Treat
(74) Attorney, Agent, or Firm—Bobby K. Truong; Hickman Palermo Truong & Becker LLP

(57) ABSTRACT

A mechanism is provided for execution of an instruction having one or more parameters that need to be resolved at runtime. Instructions being executed may be stored in non-rewritable storage. The present invention allows costly parameter resolution to be circumvented during subsequent executions of the same instruction. An interpreter invokes an optimization module when it encounters an instruction with one or more associated parameters that need to be resolved at runtime. If the optimization module determines that resolved values associated with the instruction are available in a cache, then optimization module obtains resolved values associated with the instruction from the cache. Resolving parameters into their corresponding object references is time-consuming and utilizes valuable computer resources. By obtaining resolved values stored during a previous execution of an instruction, the optimization module avoids repeatedly resolving parameters associated with an instruction. This enables efficient execution of an instruction.

51 Claims, 6 Drawing Sheets

US 6,904,516 B2

MECHANISM FOR ENABLING EFFICIENT EXECUTION OF AN INSTRUCTION

FIELD OF THE INVENTION

The present invention relates generally to computers and more specifically to a mechanism for enabling efficient execution of an instruction.

BACKGROUND

Source code for a programming language comprises a set of instructions written by a programmer. In a conventional (non interpreter-based) programming language, a compiler converts source code into object code for a specific platform. However, in an interpreter-based language such as Java, source code is compiled into bytecodes. An interpreter interprets the bytecodes at runtime, and may interpret one bytecode or instruction at a time. A java program may be platform-independent such that bytecodes can be interpreted and executed on any platform.

In a conventional programming language, for example C, the symbol table may be completely resolved at compile time. However, in an interpreter-based language like Java, bytecode parameters may need to be resolved into object references at runtime. An object reference is a reference to the address of that object in memory. For example, Java bytecodes may comprise parameters representing objects of the type CLASS, FIELD, or METHOD. Each such parameter is encoded as a small integer, called a Constant Pool Index, in a Java bytecode stream. During Java bytecode execution, a Constant Pool Index needs to be converted into its corresponding object reference. This conversion is called Constant Pool Resolution. Resolving parameters into their corresponding object references is time-consuming and utilizes valuable computer resources. Moreover, the same parameter may be resolved multiple times if the instruction with which it is associated is executed more than once. In an interpreter-based language, execution of bytecodes is slowed down because repeated resolution of parameters is required at runtime.

Traditional interpreters, for example a Java interpreter, save the costs associated with repeatedly resolving the same parameter by means of a technique called inline caching. In in-line caching, the first time an interpreter encounters an instruction during program execution, the interpreter resolves the parameters associated with the instruction. The interpreter then overwrites the associated parameters by their resolved object references, and overwrites the instruction with a different instruction whose parameters do not need to be resolved at runtime. During subsequent executions of an instruction, resolved object references are available to the interpreter without parameter resolution.

For example, in Java the instruction getstatic is used to read the value of a static field. The getstatic instruction has an associated parameter that represents a symbolic reference to the static field. In in-line caching, the first time a Java interpreter encounters a getstatic instruction, its associated parameter is resolved to the location of the field in memory. The interpreter then overwrites the associated parameter by the resolved value, and overwrites the getstatic instruction with a new instruction, getstatic_quick. During subsequent executions, the interpreter will use the resolved value to execute the getstatic_quick instruction without parameter resolution.

One problem with in-line caching is that it requires rewriting instructions. This in turn requires that the bytecodes be stored in a rewritable storage, for example Random Access Memory (RAM). In-line caching is impossible if the bytecodes being executed by an interpreter are stored in non-rewritable storage, for example Read-Only Memory (ROM). Another shortfall of in-line caching is that it changes the original bytecodes of a program; therefore, the program may no longer be copied for execution on another platform.

As the above discussion shows, in-line caching has significant drawbacks. Consequently, there exists a need for an improved mechanism for executing instructions which require parameters to be resolved at runtime.

SUMMARY

A mechanism is provided for executing an instruction having one or more parameters that need to be resolved during runtime. During execution of an instruction, if resolved values are not available in a cache, then the parameters are resolved into one or more values, and the resolved values are stored in a cache. If the resolved values are available in a cache, then the resolved values are obtained from the cache without resolving the associated parameters. The instruction is executed using the resolved values. Since resolved values are stored in a cache, the present invention does not require rewriting of instructions. Therefore, instructions being executed may be stored in a non-rewritable storage.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENT(S)

A System Overview

Figure 1:
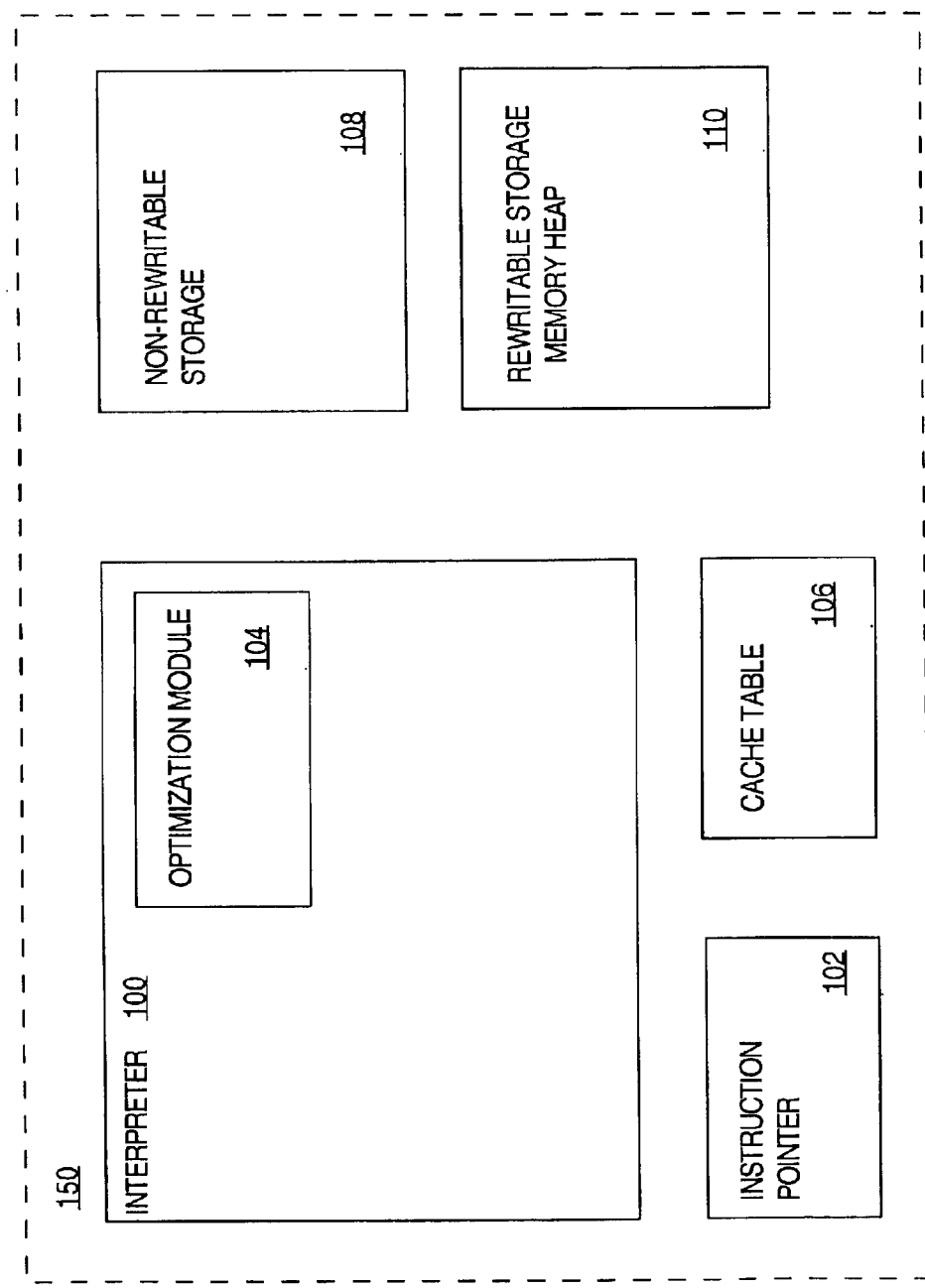
FIG. 1 is a block diagram depicting system components for one embodiment of the present invention.

With reference to FIG. 1, there are shown various logical components of a system 150 in which one embodiment of the present invention may be implemented. For purposes of illustration, an embodiment of the invention will be described in the context of an interpreter 100. However, it should be noted that the invention is not so limited. Rather, the invention may be implemented in any type of system in which one or more parameters associated with an instruction need to be resolved at runtime into one or more values. The present invention allows costly parameter resolution to be circumvented during subsequent executions of the same instruction.

As described above, interpreter 100 interprets instructions at runtime. For purposes of system 150, interpreter 100 may be any device that executes instructions written in a programming language. In one embodiment, interpreter 100 is a Java interpreter, which is part of a Java Virtual Machine. However, it should be noted that the present invention is not limited to a Java Virtual Machine. A Java interpreter interprets bytecodes at runtime. In Java, a bytecode is analogous to an instruction. A bytecode comprises an opcode, which specifies an operation to be performed, and one or more operands (parameters), which refer to data on which the operation is to be performed.

In one embodiment, system 150 comprises an instruction pointer 102. Instruction pointer 102 identifies an instruction to be executed by interpreter 100. Instructions may be stored in various types of storage. In one embodiment, instructions being executed may be stored in non-rewritable storage 108. For example, non-rewritable storage may comprise read only memory or a compact disk. Similarly, instructions being executed may be stored in rewritable storage. The layout of an instruction in storage will be described in greater detail later in this section.

In one embodiment, interpreter 100 invokes an optimization module 104 when it encounters an instruction having one or more associated parameters that need to be resolved at runtime. Optimization module 104 facilitates execution of the instruction by circumventing parameter resolution if resolved values are already available. As shown, optimization module 104 may be a logical part of interpreter 100. However, it should be noted that optimization module 104 may also reside outside interpreter 100. The operation of optimization module 104 will be described in greater detail later in this section.

In one embodiment, system 150 comprises a cache table 106. In one embodiment, cache table 106 stores resolved values associated with instructions. System 150 may comprise several instances of cache table 106, each instance storing a particular type of resolved value. For example, a Java Virtual Machine may comprise different instances of cache table 106 to store resolved values associated with objects of the type Class, Field or Method. The structure of cache table 106 and its entries will be described in greater detail later in this section.

In one embodiment, a resolved value resulting from parameter resolution may comprise a reference to a memory location. For example, in a Java Virtual Machine, a resolved value may comprise a reference to an object. A value associated with an instruction is completely resolved if the instruction may be executed without further resolution of the value. A value may be completely resolved if it comprises the address of a memory location. For example, in a Java Virtual Machine, a completely resolved value may comprise an object pointer. In one embodiment, a memory location may be located in an area of rewritable storage 110.

Non-Rewritable Storage

Figure 2:
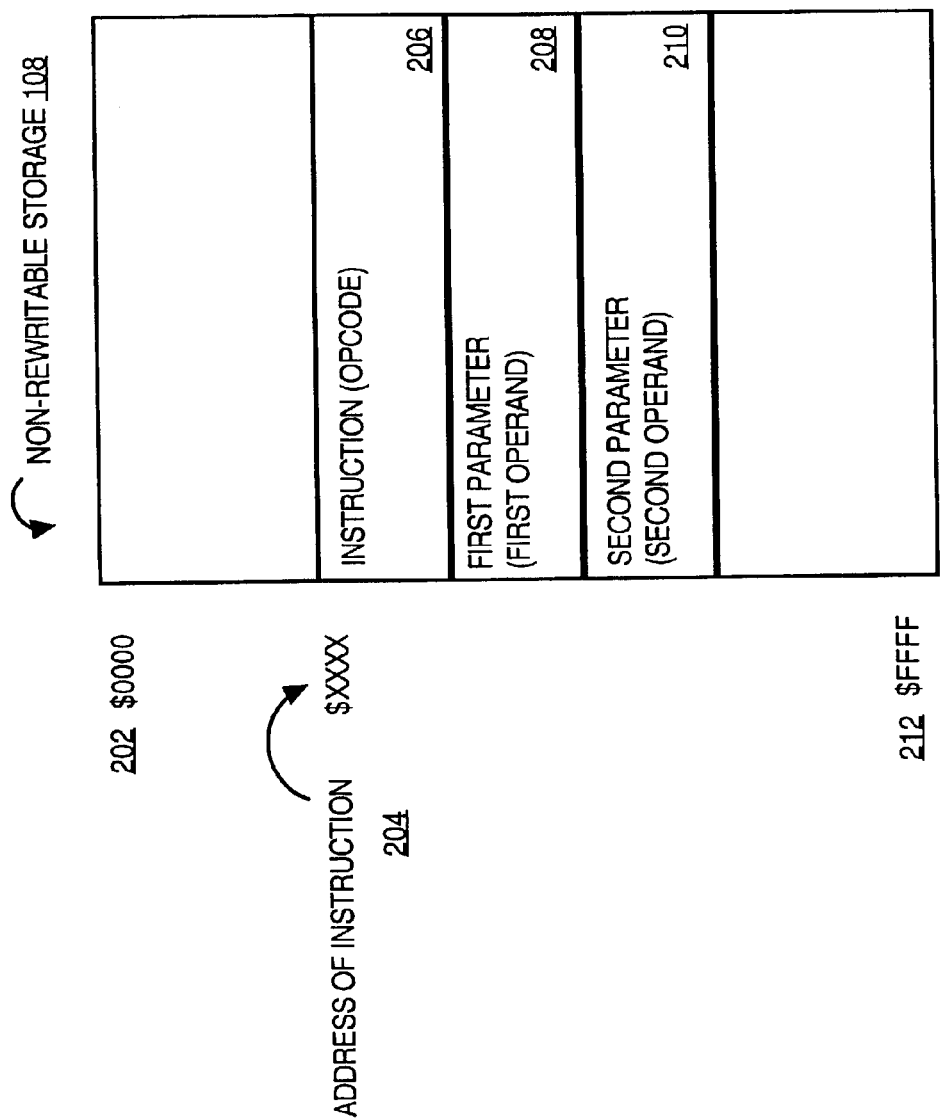
FIG. 2 depicts a logical representation of non-rewritable storage in which an instruction being executed may be located.

With reference to FIG. 2, there is shown a more detailed diagram of non-rewritable storage 108 in accordance with one embodiment of the present invention. In one embodiment, non-rewritable storage 108 comprises logical addresses from $0000 202 to $FFFF 212, where the addresses are in hexadecimal notation. For purposes of illustration, each addressed location in storage comprises one byte of data, and the size of storage is 64 kilobytes. As described above, instructions being executed may be stored in non-rewritable storage. However, it should be noted that this invention imposes no limitations on the size or type of storage in which instructions being executed are stored. For example, instructions may be stored in rewritable storage or received though a network. As discussed above, the prior solution of in-line caching requires instructions being executed to be altered at runtime. Therefore, in-line caching requires that instructions being executed be located in rewritable storage. The present invention solves that problem because it allows instructions to be stored in non-rewritable storage.

When a particular instruction 206, located at a particular address $XXXX 204, is to be executed by interpreter 100, instruction pointer 102 will refer to the address 204 of the instruction 206. Instruction 206 may have one or more associated parameters. For example, instruction 206 may have a first parameter 208 and a second parameter 210. Note that an instruction may have any number of associated parameters, and FIG. 2 shows two parameters merely to provide an example. Before instruction 206 is executed, one or more parameters associated with instruction 206 may need to be resolved at runtime into one or more resolved values. For example, in Java the instruction getstatic is used to read the value of a static field. If interpreter 100 is a Java interpreter and instruction 206 is getstatic, then an associated parameter represents a symbolic reference to the static field. During runtime, the symbolic reference must be resolved to a resolved value, where the resolved value indicates the location of the field in a memory heap 110. As discussed above, the process of parameter resolution is costly. One embodiment of the present invention reduces the costs associated with parameter resolution by storing resolved values in cache table 106.

Cache Table

Figure 3:
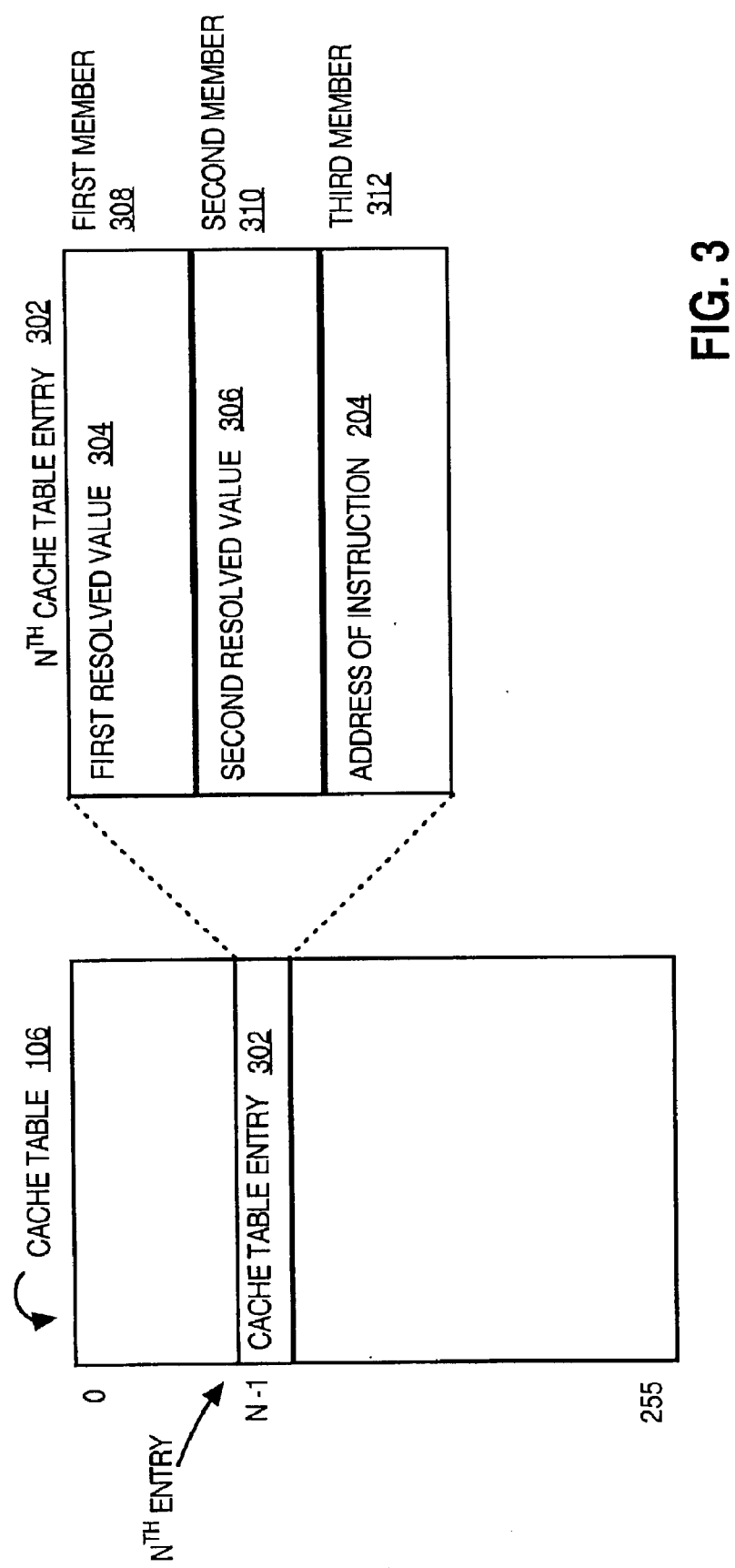
FIG. 3 depicts a logical representation of one type of cache table in which resolved values associated with an instruction may be stored.

With reference to FIG. 3, there is shown a more detailed diagram of the structure of cache table 106 in accordance with one embodiment of the present invention. In one embodiment, cache table 106 is capable of storing 256 entries, indexed from 0 to 255. However, it should be noted that this invention may be implemented using cache tables of different sizes. In one embodiment, each index to cache table 106 is zero based. Therefore, the cache table entry at index N minus 1 (N−1) is the $N^{th}$ entry in the cache table. The contents of the Nth cache table entry 302 in one embodiment are shown in detail in FIG. 3.

In one embodiment, each cache table entry may store two types of data. One type of data stored at Nth cache table entry 302 comprises resolved values associated with an instruction. For example, if the Nth cache table entry is associated with instruction 206, and instruction 206 is getstatic, then a first member 308 of Nth cache table entry 302 stores a resolved reference to the location of a static field in memory, namely, a first resolved value 304. If instruction 206 has more than one associated parameters that need to be resolved at runtime, then resolved values associated with each parameter may be stored at the Nth cache table entry 302. For example, if instruction 206 has two parameters that require resolution at runtime, then:

first parameter 208 is resolved into first resolved value 304, which is stored in first member 308 of Nth cache table entry 302, and second parameter 210 is resolved into a second resolved value 306, which is stored in a second member 310 of Nth cache table entry 302.

As discussed above, it is also possible for resolved values associated with instruction 206 to be stored at entries in different cache tables, with each cache table being used to store a particular type of resolved value.

In one embodiment, a second type of data stored at Nth cache table entry 302 indicates the instruction whose associated resolved values are stored at that entry. For example, Nth cache table entry 302 may store the address 204 of instruction 206 in its third member 312. Storing address 204 of instruction 206 at Nth cache table entry 302 indicates that this entry stores resolved values associated with instruction 206.

The present invention imposes no limitations on the contents of a particular cache table entry. Each cache table entry stores resolved values associated with a particular instruction, and may store additional data if needed. For example, Nth cache table entry 302 need not store address of instruction 204 if it is predetermined that resolved values associated with instruction 206 are stored at Nth cache table entry 302. A particular cache table entry may be implemented using various types of data structures. For example, Nth cache table entry 302 may be implemented as a linked list or an array.

Representative Operation

Figure 4:
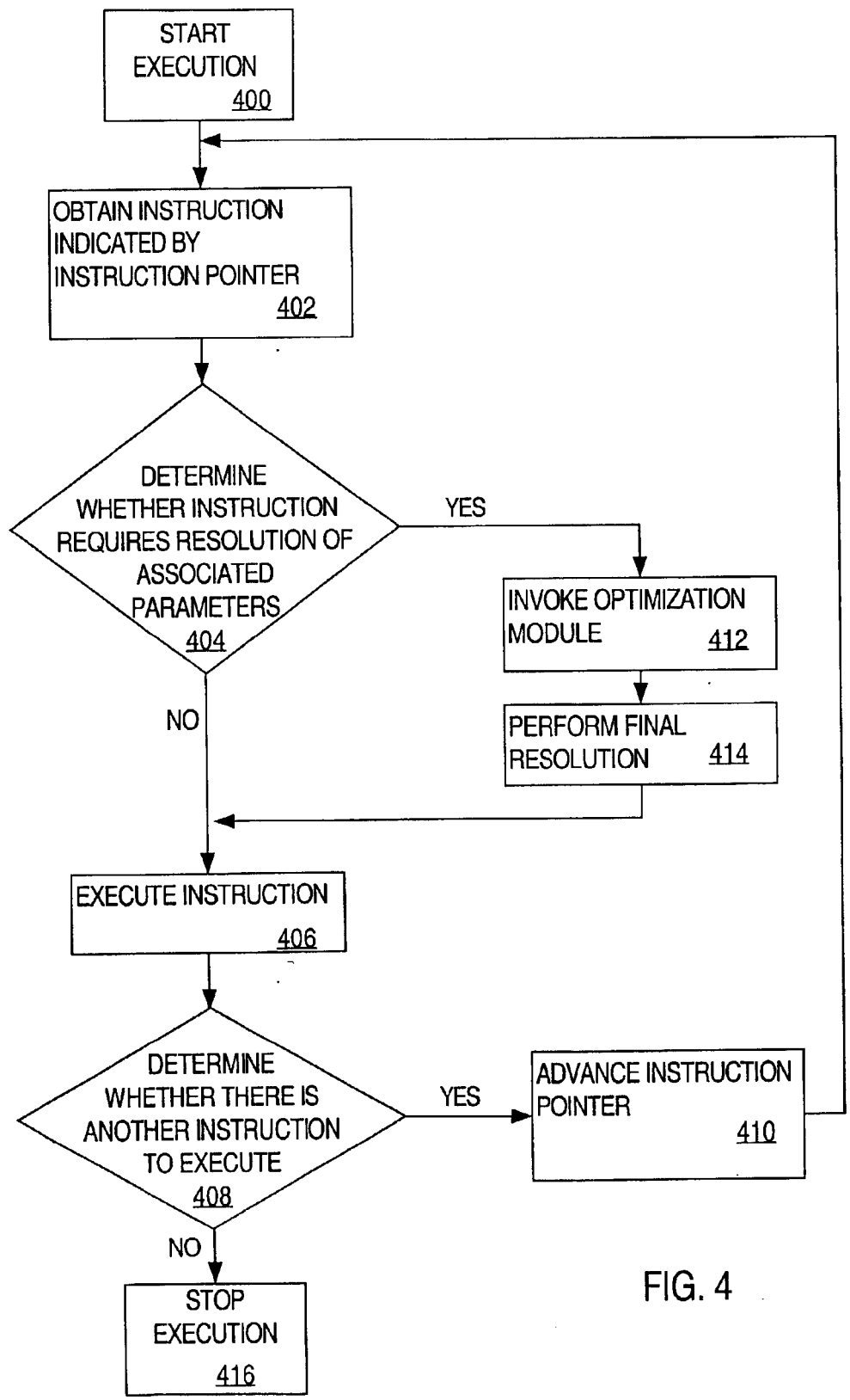
FIG. 4 is a flowchart illustrating the operational flow for executing a program comprising one or more instructions in accordance with one embodiment of the present invention.

With reference to the flow diagrams shown in FIG. 4 and FIG. 5, the operation of one embodiment of the present invention will now be described. With reference to FIG. 4, there is shown a flow diagram of execution of a program by interpreter 100. After interpreter 100 starts (400) execution of a program, it proceeds to obtain (402) an instruction identified by instruction pointer 102. As described above, an instruction may be located in non-rewritable storage 108. As noted above, an instruction may have one or more associated parameters that need to be resolved into memory location references during runtime. Upon obtaining (402) an instruction to be executed, interpreter 100 determines (404) whether the instruction requires any associated parameters to be resolved at runtime. In one embodiment, this determination (404) is made based on the instruction's opcode. For example, in a Java Virtual Machine, the getstatic instruction requires a parameter to be resolved at runtime.

At some point during execution of a program, interpreter 100 will most likely determine (404) that at least one instruction has parameters that need to be resolved at runtime. When that occurs, interpreter 100 invokes (412) optimization module 104. Optimization module 104 provides resolved values for the current instruction to interpreter 100. The operation of optimization module 104 is described in greater detail later in this section.

After optimization module 104 provides resolved values to interpreter 100, in one embodiment, interpreter 100 may need to perform (414) final resolution of these resolved values. For example, in a Java Virtual Machine, for an object of type field, the resolved value provided by optimization module 104 may comprise the offset of the field within its parent class. This offset may be further resolved by interpreter 100 for a particular instance of the parent class.

Resolution logic performed (414) by interpreter 100 needs to be carried out each time an instruction is executed, while resolution logic performed by optimization module 104 needs to be carried out only if the resolved values are not present in cache. Therefore, in one embodiment, optimization module 104 returns a resolved value that requires interpreter 100 to perform (414) as few resolution steps as possible. The resolved value returned by interpreter 100 may comprise the furthest resolution of a parameter that is common across all executions of the instruction with which the parameter is associated. If final resolution is not required for a particular resolved value, interpreter 100 does not perform final resolution. Instead, interpreter 100 uses the resolved value(s) provided by optimization module 104 to execute (406) the present instruction. If final resolution is required, then interpreter 100 performs (414) final resolution. After performing (414) final resolution, interpreter 100 uses the result of final resolution to execute (406) the instruction.

If interpreter 100 determines (404) that resolution of associated parameters is not required for the current instruction, then interpreter 100 executes (406) the current instruction without using any resolved values. After executing (406) an instruction, interpreter 100 determines (408) whether there is another instruction to be executed for the current program. If there is another instruction to be executed, then interpreter 100 advances (410) instruction pointer 102, and continues by obtaining (402) the next instruction identified by instruction pointer 102, as described above. If there are no more instructions to execute, then interpreter 100 stops (416) execution of the program.

Optimization Module

Figure 5:
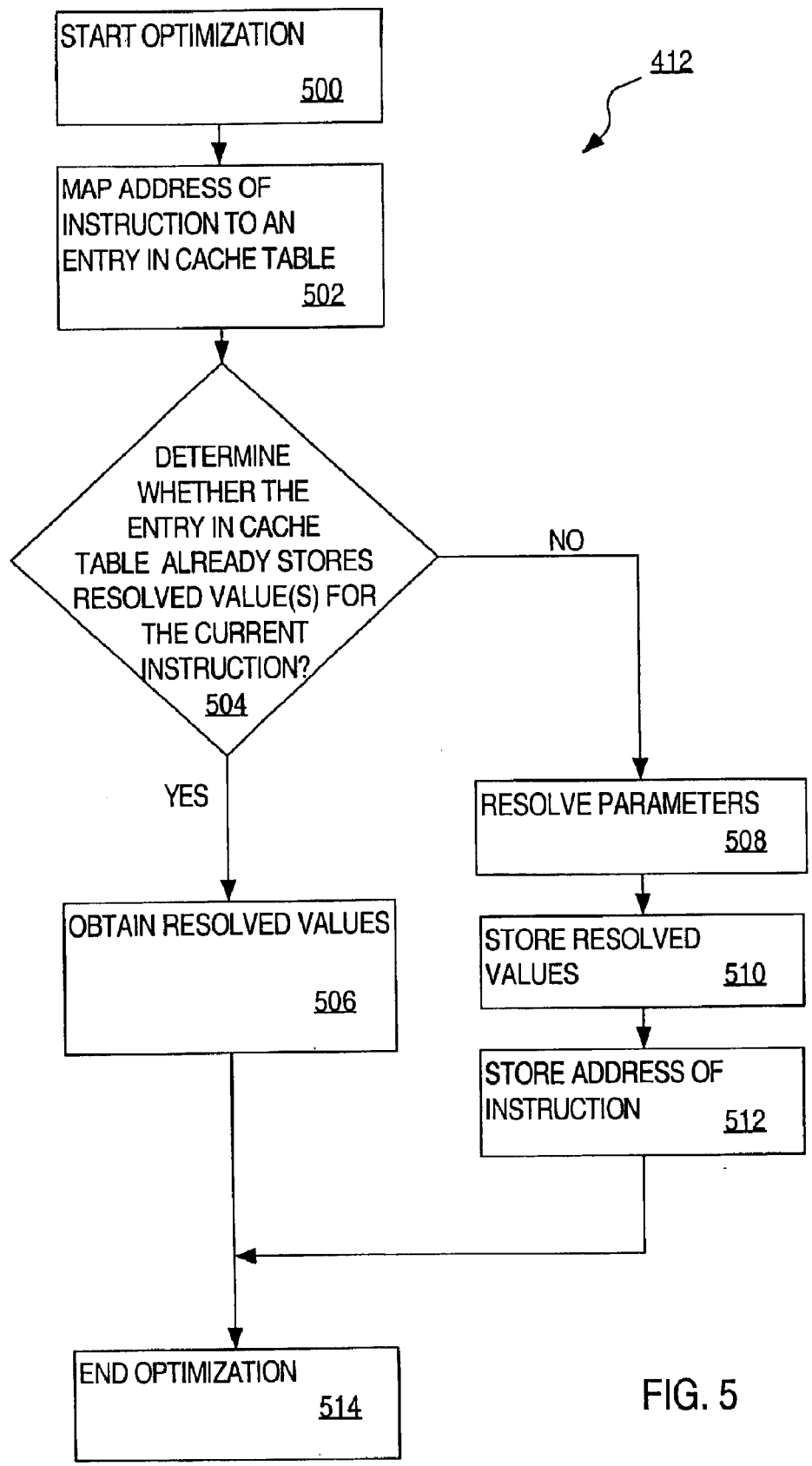
FIG. 5 is a flowchart illustrating the operation of an optimization module in accordance with one embodiment of the present invention.

With reference to FIG. 5, there is shown a flow diagram of operation of optimization module 104. In one embodiment, when interpreter 100 encounters an instruction having one or more associated parameters that need to be resolved during runtime, interpreter 100 invokes (412) optimization module 104. When interpreter 100 invokes (412) optimization module 104, interpreter 100 specifies the instruction being interpreted and optimization module 104 uses the specified instruction to perform the operations described in FIG. 5. For purposes of illustration, optimization module 104 is operating on instruction 206, which has one or more associated parameters. For example, instruction 206 may be a getstatic instruction.

In one embodiment, after start (500) of optimization for an instruction, optimization module 104 maps (502) the address of the instruction to a particular location in cache table 106. For example, after start (500) of optimization for instruction 206, optimization module 104 maps (502) address of instruction ($XXXX) 204 to a particular index N minus one (N−1) in cache table 106. As described above, index N minus 1 refers to Nth cache table entry 302. Mapping (502) is performed by optimization module 104 to determine the cache table entry corresponding to an instruction. In one embodiment, mapping (502) may be performed by hashing the address of an instruction to derive the index for a particular location in cache table 106.

After mapping (502) an instruction to a particular location in cache table 106, optimization module 104 may need to determine (504) whether resolved values associated with the instruction have already been saved at that location in cache table 106. For example, after mapping instruction 206 to Nth cache table entry 302, optimization module 104 may need to determine (504) whether resolved values associated with instruction 206 have already been saved at Nth cache table entry 302. As described above, in one embodiment the address of an instruction may have been stored at a cache table entry to indicate that resolved values associated with the instruction are available at that cache table entry. Therefore, determining (504) comprises checking whether the address of the instruction is stored at that cache table entry. For example, address 204 of instruction 206 may have been stored at third member 312 of Nth cache table entry 302 to indicate that resolved values associated with instruction 206 are available at that cache table entry. In this example, determining (504) comprises checking whether the value of third member 312 is equal to address of instruction 204.

If optimization module 104 determines that resolved values associated with an instruction are available at the mapped location in cache table 106, then optimization module 104 obtains (506) resolved values associated with the instruction from that cache table location. For example, if optimization module 104 determines that resolved values associated with instruction 206 are available at Nth cache table entry 302, then optimization module 104 obtains (506) resolved values associated with instruction 206 from Nth cache table entry 302. As described above, first resolved value 304 associated with a getstatic instruction is obtained from first member 308 of Nth cache table entry 302. By obtaining (506) resolved values which were stored in cache table 106 during a previous execution of an instruction, optimization module 104 avoids repeatedly resolving parameters associated with the instruction. This reduces the time required to execute an instruction. After resolved values have been obtained from cache table 106, optimization module 104 ends (514) optimization for the current instruction and returns to interpreter 100.

If optimization module 104 determines that resolved values associated with an instruction are not available at the mapped location in cache table 106, then optimization module 104 resolves (508) parameters associated with the instruction. For example, if optimization module 104 determines that resolved values associated with instruction 206 are not available at Nth cache table entry 302, then optimization module 104 resolves (508) parameters associated with instruction 206. In one embodiment, resolving (508) parameters comprises constant pool resolution. In constant pool resolution, a constant pool index associated with an instruction's parameter is converted to an object pointer at runtime. For example, in a Java Virtual Machine, optimization module 104 resolves first parameter 208 associated with a getstatic instruction 206 into first resolved value 304.

After resolving (508) parameter(s) for an instruction, optimization module 104 stores (510) resolved values at the mapped location in cache table 106. For example, as described above, when address 204 of instruction 206 maps to Nth entry in cache table 302, first resolved value 304 associated with instruction 206 is stored at first member 308 of Nth cache table entry 302. After storing (510) resolved values associated with an instruction at the mapped location in cache table 106, optimization module 104 may also store data to indicate that resolved values for the instruction have been cached. As described above, in one embodiment optimization module 104 stores (512) the address of an instruction at the mapped location in cache table 106 to indicate that resolved values associated with the instruction have been stored at this cache table entry. For example, optimization module 104 stores (512) address 204 of instruction 206 at third member 312 of Nth entry in cache table 302 to indicate that resolved values associated with instruction 206 have been stored at this cache table entry. After storing (512) data to indicate the instruction whose resolved values have been cached, optimization module 104 ends (514) optimization for the specified instruction and returns to interpreter 100.

Although optimization module 104 has been described as being invoked (412) by interpreter 100, the optimization module 104 of the present invention may be invoked by any process that requires runtime resolution of parameters. Instructions being executed may be stored in rewritable or non-rewritable storage. The present invention may be implemented using various types of cache tables and various types of cache table entries. Various means may be used to indicate that resolved values associated with instruction 206 have been cached. These and many alternate implementations are within the scope of the present invention.

Hardware Overview

Figure 6:
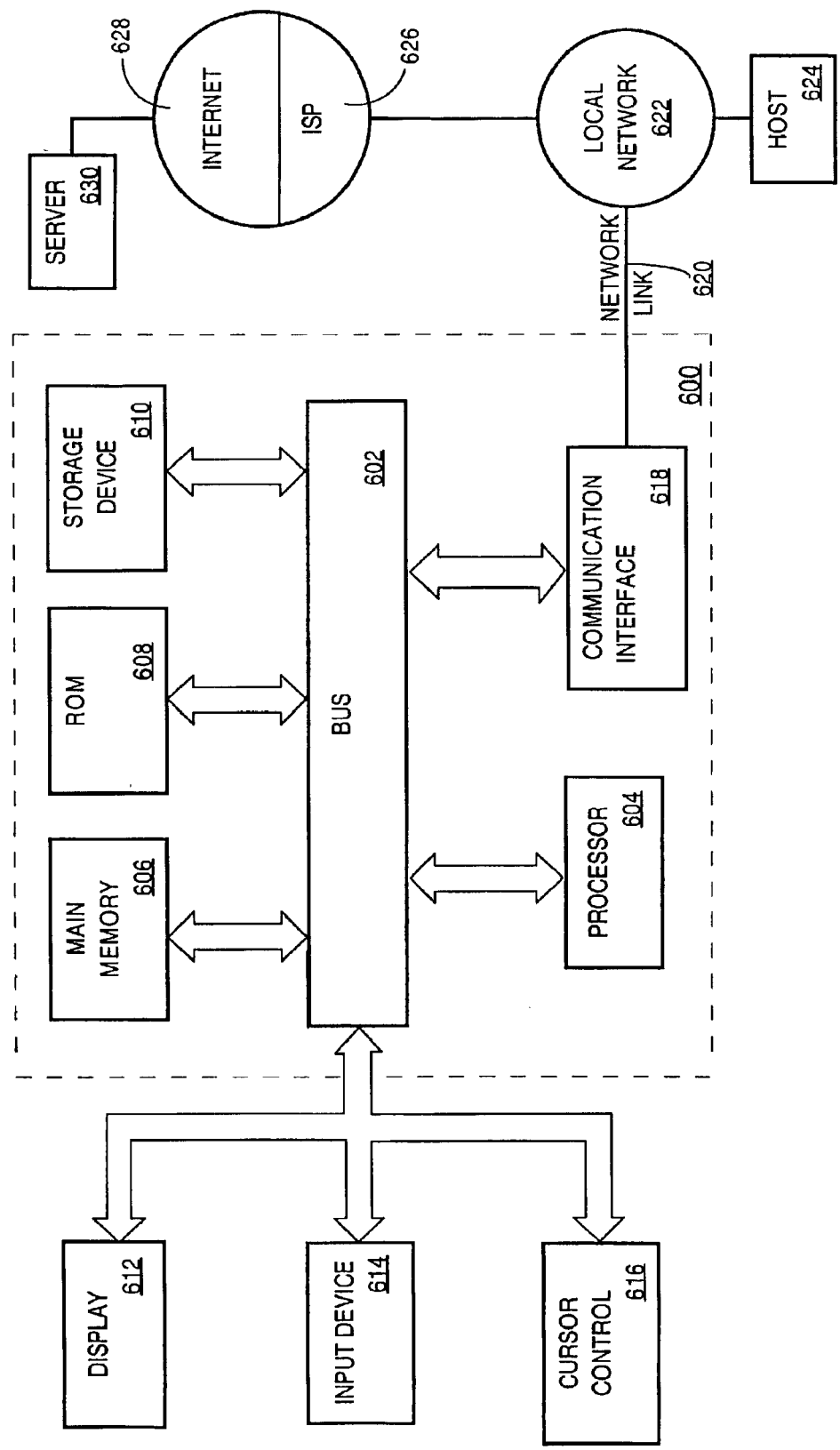
FIG. 6 is a block diagram of a computer system on which embodiments of the invention may be implemented.

FIG. 6 is a block diagram that illustrates a computer system 600 upon which an embodiment of the invention may be implemented. For example, system 150 may be implemented upon computer system 600. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. In one embodiment, the one or more instructions contained in main memory 606 may comprise interpreter 100 and optimization module 104. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A computer implemented method for executing an instruction, comprising:

encountering an instruction and one or more associated parameters, said instruction requiring that said one or more parameters be resolved at runtime;

determining whether said one or more parameters have previously been resolved during runtime;

in response to a determination that said one or more parameters have previously been resolved during runtime to one or more values, obtaining said one or more values without resolving said one or more associated parameters; and executing said instruction using said one or more values.

2. The method of claim 1, wherein said one or more values comprises a memory location reference.

3. The method of claim 2, wherein said memory location reference references a location on a dynamically allocated memory heap.

4. The method of claim 1, wherein determining comprises:

accessing a resolved value cache; and determining whether said cache comprises an entry corresponding to said instruction.

5. The method of claim 4, wherein said entry corresponding to said instruction comprises said one or more values, and wherein obtaining comprises:

obtaining said one or more values from said entry corresponding to said instruction.

6. The method of claim 1, further comprising:

in response to a determination that said one or more parameters have not previously been resolved during runtime, resolving said one or more parameters to one or more particular values;

storing said one or more particular values into a resolved value cache; and executing said instruction using said one or more particular values.

7. The method of claim 6, wherein storing comprises:

accessing said resolved value cache;

creating an entry in said cache which corresponds to said instruction; and storing said one or more values into said entry.

8. The method of claim 7, wherein:

said instruction is at a particular address;

said particular address is mapped to a particular location in said resolved value cache; and said entry is created at said particular location.

9. The method of claim 7, wherein said instruction is at a particular address; further comprising:

storing an indication of said address at said entry in said cache.

10. The method of claim 1, wherein said instruction is at a particular address, and wherein determining comprises:
- accessing a resolved value cache; and
- determining whether any entry in said cache comprises an indication of said particular address.

11. The method of claim 1, wherein said instruction being executed is stored in non-rewritable memory.

12. The method of claim 1, wherein said method is implemented by an interpreter.

13. The method of claim 12, wherein said interpreter comprises a Java interpreter.

14. The method of claim 13, wherein said one or more parameters comprises a constant pool index, and wherein said constant pool index is resolved to an object reference at runtime.

15. The method of claim 1, wherein:
- said one or more values represents a result of a complete resolution of said one or more parameters.

16. The method of claim 1, wherein:
- said one or more values represents a result of a partial resolution of said one or more parameters.

17. The method of claim 16, wherein said one or more values may be further resolved to achieve a complete resolution of said one or more parameters.

18. The method of claim 16, wherein said one or more values remain constant across all executions of said instruction.

19. A computer-readable medium comprising:
- instructions for causing one or more processors to encounter a particular instruction and one or more associated parameters, said particular instruction requiring that said one or more parameters be resolved at runtime;
- instructions for causing one or more processors to determine whether said one or more parameters have previously been resolved during runtime;
- instructions for causing one or more processors to obtain, in response to a determination that said one or more parameters have previously been resolved during runtime to one or more values, said one or more values without resolving said one or more associated parameters; and
- instructions for causing one or more processors to execute said particular instruction using said one or more values.

20. The computer-readable medium of claim 19, wherein said one or more values comprises a memory location reference.

21. The computer-readable medium of claim 20, wherein said memory location reference references a location on a dynamically allocated memory heap.

22. The computer-readable medium of claim 19, wherein the instructions for causing one or more processors to determine comprise:
- instructions for causing one or more processors to access a resolved value cache; and
- instructions for causing one or more processors to determine whether said cache comprises an entry corresponding to said particular instruction.

23. The computer-readable medium of claim 22, wherein said entry corresponding to said particular instruction comprises said one or more values, and wherein the instructions for causing one or more processors to obtain comprise:
- instructions for causing one or more processors to obtain said one or more values from said entry corresponding to said particular instruction.

24. The computer-readable medium of claim 19, further comprising:
- instructions for causing one or more processors to resolve, in response to a determination that said one or more parameters have not previously been resolved during runtime, said one or more parameters to one or more particular values;
- instructions for causing one or more processors to store said one or more particular values into a resolved value cache; and
- instructions for causing one or more processors to execute said particular instruction using said one or more particular values.

25. The computer-readable medium of claim 24, wherein the instructions for causing one or more processors to store comprise:
- instructions for causing one or more processors to access said resolved value cache;
- instructions for causing one or more processors to create an entry in said cache which corresponds to said particular instruction; and
- instructions for causing one or more processors to store said one or more values into said entry.

26. The computer-readable medium of claim 25, wherein:
- said particular instruction is at a particular address;
- said particular address is mapped to a particular location in said resolved value cache; and
- said entry is created at said particular location.

27. The computer-readable medium of claim 25, wherein said particular instruction is at a particular address; further comprising:
- instructions for causing one or more processors to store an indication of said address at said entry in said cache.

28. The computer-readable medium of claim 19, wherein said particular instruction is at a particular address, and wherein the instructions for causing one or more processors to determine comprise:
- instructions for causing one or more processors to access a resolved value cache; and
- instructions for causing one or more processors to determine whether any entry in said cache comprises an indication of said particular address.

29. The computer-readable medium of claim 19, wherein said particular instruction being executed is stored in non-rewritable memory.

30. The computer-readable medium of claim 19, wherein:
- said one or more values represents a result of a complete resolution of said one or more parameters.

31. The computer-readable medium of claim 19, wherein:
- said one or more values represents a result of a partial resolution of said one or more parameters.

32. The computer-readable medium of claim 31, wherein said one or more values may be further resolved to achieve a complete resolution of said one or more parameters.

33. The computer-readable medium of claim 31, wherein said one or more values remain constant across all executions of said particular instruction.

34. An apparatus comprising:
- means for encountering an instruction and one or more associated parameters, said instruction requiring that said one or more parameters be resolved at runtime;
- means for determining whether said one or more parameters have previously been resolved during runtime;
- means for obtaining, in response to a determination that said one or more parameters have previously been resolved during runtime to one or more values, said one or more values without resolving said one or more associated parameters; and means for executing said instruction using said one or more values.

35. The apparatus of claim 34, wherein said one or more values comprises a memory location reference.

36. The apparatus of claim 35, wherein said memory location reference references a location on a dynamically allocated memory heap.

37. The apparatus of claim 34, wherein the means for determining comprises:

means for accessing a resolved value cache; and means for determining whether said cache comprises an entry corresponding to said instruction.

38. The apparatus of claim 37, wherein said entry corresponding to said instruction comprises said one or more values, and wherein the means for obtaining comprises:

means for obtaining said one or more values from said entry corresponding to said instruction.

39. The apparatus of claim 34, further comprising:

means for resolving, in response to a determination that said one or more parameters have not previously been resolved during runtime, said one or more parameters to one or more particular values;

means for storing said one or more particular values into a resolved value cache; and means for executing said instruction using said one or more particular values.

40. The apparatus of claim 39, wherein the means for storing comprises:

means for accessing said resolved value cache;

means for creating an entry in said cache which corresponds to said instruction; and means for storing said one or more values into said entry.

41. The apparatus of claim 40, wherein:

said instruction is at a particular address;

said particular address is mapped to a particular location in said resolved value cache; and said entry is created at said particular location.

42. The apparatus of claim 40, wherein said instruction is at a particular address and wherein said apparatus further comprises:

means for storing an indication of said address at said entry in said cache.

43. The apparatus of claim 34, wherein said instruction is at a particular address, and wherein the means for determining comprises:

means for accessing a resolved value cache; and means for determining whether any entry in said cache comprises an indication of said particular address.

44. The apparatus of claim 34, wherein said instruction being executed is stored in non-rewritable memory.

45. The apparatus of claim 34, wherein said apparatus is implemented as an interpreter.

46. The apparatus of claim 45, wherein said interpreter comprises a Java interpreter.

47. The apparatus of claim 46, wherein said one or more parameters comprises a constant pool index, and wherein said constant pool index is resolved to an object reference at runtime.

48. The apparatus of claim 34, wherein:

said one or more values represents a result of a complete resolution of said one or more parameters.

49. The apparatus of claim 34, wherein:

said one or more values represents a result of a partial resolution of said one or more parameters.

50. The apparatus of claim 49, wherein said one or more values may be further resolved to achieve a complete resolution of said one or more parameters.

51. The apparatus of claim 49, wherein said one or more values remain constant across all executions of said instruction.

* * * * *